United States Patent
Tsuji et al.

(10) Patent No.: US 11,161,991 B2
(45) Date of Patent: Nov. 2, 2021

(54) LITHOGRAPHIC INK

(71) Applicant: TORAY INDUSTRIES, INC., Tokyo (JP)

(72) Inventors: Yuichi Tsuji, Otsu (JP); Takejiro Inoue, Otsu (JP); Seiichiro Murase, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 138 days.

(21) Appl. No.: 15/777,072

(22) PCT Filed: Nov. 24, 2016

(86) PCT No.: PCT/JP2016/084756
§ 371 (c)(1),
(2) Date: May 17, 2018

(87) PCT Pub. No.: WO2017/090663
PCT Pub. Date: Jun. 1, 2017

(65) Prior Publication Data
US 2018/0371269 A1 Dec. 27, 2018

(30) Foreign Application Priority Data

Nov. 25, 2015 (JP) .............................. JP2015-229340
Mar. 11, 2016 (JP) ................................. 2016-048046
May 25, 2016 (JP) ................................. 2016-104088

(51) Int. Cl.
| | | |
|---|---|---|
| *C09D 11/101* | (2014.01) | |
| *B41M 1/06* | (2006.01) | |
| *C09D 11/107* | (2014.01) | |
| *C09D 11/037* | (2014.01) | |

(52) U.S. Cl.
CPC ............. *C09D 11/101* (2013.01); *B41M 1/06* (2013.01); *C09D 11/037* (2013.01); *C09D 11/107* (2013.01)

(58) Field of Classification Search
None
See application file for complete search history.

(56) References Cited

U.S. PATENT DOCUMENTS

| | | |
|---|---|---|
| 2004/0115561 A1 | 6/2004 | Laksin et al. |
| 2012/0108702 A1 | 5/2012 | Miller et al. |
| 2013/0310479 A1 | 11/2013 | Lee et al. |
| 2018/0327617 A1 | 11/2018 | Inoue et al. |

FOREIGN PATENT DOCUMENTS

| | | | | |
|---|---|---|---|---|
| CN | 104854200 A | 8/2015 | | |
| JP | 4-283212 A | 10/1992 | | |
| JP | 10-195361 A | 7/1998 | | |
| JP | 10195361 A | * 7/1998 | | |
| JP | 2000-53904 A | 2/2000 | | |
| JP | 2001-2967 A | 1/2001 | | |
| JP | 2008-143993 A | 6/2008 | | |
| JP | 2010-59333 A | 3/2010 | | |
| JP | 2012-531484 A | 12/2012 | | |
| WO | WO-2014106939 A1 | * 7/2014 | ............ | C08G 18/10 |
| WO | WO 2014/156812 A1 | 10/2014 | | |
| WO | WO-2014156812 A1 | * 10/2014 | | |
| WO | WO 2015/023428 A2 | 2/2015 | | |
| WO | WO 2017/047817 A1 | 3/2017 | | |
| WO | WO 2017/204104 A1 | 11/2017 | | |
| WO | WO 2018/062108 A1 | 4/2018 | | |

OTHER PUBLICATIONS

Singaporean Search Report and Written Opinion for Singaporean Application No. 11201804262U, dated Mar. 26, 2019.
Extended European Search Report, dated May 24, 2019, for European Application No. 16868606.1.
International Search Report for PCT/JP2016/084756 (PCT/ISA/210) dated Jan. 31, 2017.
Written Opinion of the International Searching Authority for PCT/JP2016/084756 (PCT/ISA/237) dated Jan. 31, 2017.
English translation of the Written Opinion of the International Searching Authority (PCT/ISA/237) dated Jan. 31, 2017 for Application No. PCT/JP2016/084756.

* cited by examiner

*Primary Examiner* — Joshua D Zimmerman
(74) *Attorney, Agent, or Firm* — Birch, Stewart, Kolasch & Birch LLP

(57) ABSTRACT

Provided is a lithographic ink having superior surface staining resistance and fluidity. Also provided is a method for manufacturing a printed material using the lithographic ink. The lithographic ink has all of a viscosity (A) at a rotational speed of 0.5 rpm, a viscosity (B) at a rotational speed of 20 rpm, and a viscosity (C) at a rotational speed of 50 rpm of 5 Pa·s or more and 100 Pa·s or less, the viscosities (A), (B), and (C) being measured by using a cone-plate rotating viscometer at 25° C., and has a viscosity ratio (C)/(B) of 0.8 or more and 1.0 or less.

17 Claims, No Drawings

LITHOGRAPHIC INK

TECHNICAL FIELD

The present invention relates to a lithographic ink and a method for manufacturing a printed material using the lithographic ink.

BACKGROUND ART

Lithography is a printing system widely used as a system capable of inexpensively supplying a large volume of printed material at high speed.

In lithography, a substance repulsive with ink is patterned as a non-printing part to form an image. Examples of lithography include water lithography using wetting water as the substance repulsive with and waterless lithography using a silicone rubber. However, when the cohesive force of the ink is insufficient under high shear during printing in both lithography systems, the ink also adheres to the non-printing part to which the ink does not originally adhere without repulsion. The adhering ink is printed on a white background of the printed material. This phenomenon is called surface staining, and is a type of printing failure. When the cohesive force of the ink is small, spinnability becomes strong, so that it causes a problem that misting is apt to occur. The misting referred herein is a phenomenon in which the ink during printing scatters in a misty state, and is a type of printing failure.

In a conventional lithographic ink, in order to increase the cohesive force of the ink, application of a high molecular weight resin (Patent Document 1), crosslinking through gelation reaction (Patent Document 2), and increase in resin concentration in the ink (Patent Document 3) suppress surface staining.

PRIOR ART DOCUMENT

Patent Documents

Patent Document 1: Japanese Patent Laid-Open Publication No. 2013-144765 (Claims)
Patent Document 2: Japanese Patent Laid-Open Publication No. 2001-335728 (Claims)
Patent Document 3: Japanese Patent Laid-Open Publication No. 2008-143993 (Claims)

SUMMARY OF THE INVENTION

Problems to be Solved by the Invention

However, any of these methods increase the viscosity of the ink, which causes lowered fluidity, so that various problems occur in view of printability. For example, the ink transfer to a printing plate becomes poor, which causes an image to be incorrectly printed on a printed material. A high viscosity causes a lowered leveling property, so that irregularities are apt to occur in a surface of a film of the ink transferred to the printed material, which causes lowered gloss of the printed material.

Particularly, in recent years, an active energy ray-curable lithographic ink actively used because of high productivity provided by instantaneous curing has poor surface staining resistance and printed material glossiness as compared with an oil-based lithographic ink, and this would be problematic. The reason for this is that the active energy ray-curable lithographic ink contains a resin having a small molecular weight as compared with the resin of the oil-based lithographic ink, so that the cohesive force of the ink is small. A (meth)acrylate compound as its main component has a poor repulsion property to wetting water and a silicone rubber as compared with the solvent component of the oil-based lithographic ink, which is apt to cause surface staining. Regarding the gloss of the printed material, since the ink is instantly cured by the irradiation of the active energy ray, the ink has no time for leveling, which tends to cause the gloss of the printed material to largely decrease as compared with the oil-based lithography.

An object of the present invention is to provide a lithographic ink which overcomes the above problems of the prior arts and has superior surface staining resistance and fluidity.

Solutions to the Problems

The present invention provides a lithographic ink having all of a viscosity (A) at a rotational speed of 0.5 rpm, a viscosity (B) at a rotational speed of 20 rpm, and a viscosity (C) at a rotational speed of 50 rpm of 5 Pa·s or more and 100 Pa·s or less, the viscosities (A), (B), and (C) being measured by using a cone-plate rotating viscometer at 25° C., and having a viscosity ratio (C)/(B) of 0.8 or more and 1.0 or less.

Effects of the Invention

The present invention provides a lithographic ink having superior surface staining resistance and fluidity, because the lithographic ink has all of a viscosity (A) at a rotational speed of 0.5 rpm, a viscosity (B) at a rotational speed of 20 rpm, and a viscosity (C) at a rotational speed of 50 rpm of 5 Pa·s or more and 100 Pa·s or less, the viscosities (A), (B), and (C) being measured by using a cone-plate rotating viscometer at 25° C., and has a viscosity ratio (C)/(B) of 0.8 or more and 1.0 or less. Use of the lithographic ink makes it possible to provide a printed material having no stain and exhibiting high gloss.

EMBODIMENTS OF THE INVENTION

Hereinafter, the present invention will be specifically described.

A viscosity of a lithographic ink according to the present invention is measured at 25° C. from 0.15 ml of the ink weighed with an ink pipette by using a cone-plate rotating viscometer.

A viscosity (A) of the lithographic ink of the present invention at a rotational speed of 0.5 rpm is 5 Pa·s or more and 100 Pa·s or less. When the viscosity (A) is 5 Pa·s or more, the ink exhibits a superior transfer property between rollers. The viscosity (A) is more preferably 10 Pa·s or more, and still more preferably 20 Pa·s or more. When the viscosity (A) is 100 Pa·s or less, the fluidity of the ink becomes favorable, and a printed material using the ink exhibits high glossiness. The viscosity (A) is more preferably 80 Pa·s or less, and still more preferably 60 Pa·s or less.

Both of a viscosity (B) at a rotational speed of 20 rpm and a viscosity (C) at a rotational speed of 50 rpm of the lithographic ink of the present invention are preferably 5 Pa·s or more and 100 Pa·s or less. When both the viscosity (B) and the viscosity (C) are 5 Pa·s or more, the ink has an increased cohesive force, and the surface staining resistance of the ink can be improved. The viscosity (B) and the viscosity (C) are more preferably 10 Pa·s or more, and still more preferably 15 Pa·s or more. When the viscosity (B) and the viscosity (C) are 100 Pa·s or less, the ink has a favorable transfer property to a lithography plate. The viscosity (B) and the viscosity (C) are more preferably 40 Pa·s or less, and still more preferably 20 Pa·s or less.

A viscosity ratio (C)/(B), which is the ratio of the viscosity (B) to the viscosity (C) of the lithographic ink of the present invention, is 0.8 or more and 1.0 or less. The viscosity ratio (C)/(B) is more preferably 0.85 or more and 1.0 or less, and still more preferably 0.9 or more and 1.0 or less. When the viscosity ratio (C)/(B) is within the above range, the cohesive force of the ink is sufficiently maintained even under high shear at a high speed during printing, so that the surface staining resistance of the ink can be improved.

The lithographic ink of the present invention preferably has a viscosity (D) at a rotational speed of 80 rpm of 5 Pa·s or more and 100 Pa·s or less. When the viscosity (D) is 5 Pa·s or more, the cohesive force of the ink increases even under higher shear, so that the surface staining resistance of the ink can be improved. The viscosity (D) is more preferably 10 Pa·s or more, and still more preferably 15 Pa·s or more. When the viscosity (D) is 100 Pa·s or less, the ink has a favorable transfer property to a lithography plate. The viscosity (D) is more preferably 40 Pa·s or less, and still more preferably 20 Pa·s or less.

A viscosity ratio (D)/(B), which is the ratio of the viscosity (B) to the viscosity (D) of the lithographic ink of the present invention, is preferably 0.8 or more and 1.0 or less. The viscosity ratio (D)/(B) is more preferably 0.85 or more and 1.0 or less, and still more preferably 0.9 or more and 1.0 or less. When the viscosity ratio (D)/(B) is within the above range, the cohesive force of the ink is sufficiently maintained even under high shear at a high speed during printing, so that the surface staining resistance of the ink can be improved.

A value of a loss tangent of the lithographic ink of the present invention (tan δ, hereinafter simply referred to as "tan δ") is measured by sinusoidal oscillation using viscoelastometer. Here, tan δ is the ratio of the storage elastic modulus G' to the loss elastic modulus G" (G"/G'). A smaller tan δ value means that the lithographic ink has an increased property for returning to an original shape against deformation. On the other hand, a larger tan δ value means that the lithographic ink has an increased property for following deformation.

The lithographic ink of the present invention preferably has a tan δ value of 1.0 or more and 2.0 or less at 25° C. and 1000 (rad/s). During printing, the lithographic ink receives high shear of 1000 (rad/s) or more on a roller or a plate surface. Since the lithographic ink of the present invention exhibits behavior as a liquid, and has a favorable transfer property between rollers and a transfer property to a printing part, the tan δ value at 1000 (rad/s) is preferably 1.0 or more. The tan δ value is more preferably 1.2 or more, and still more preferably 1.4 or more. On the other hand, in order to impart a high cohesive force under high shear to the lithographic ink of the present invention to improve the surface staining resistance, the tan δ value at 1000 (rad/s) is preferably 2.0 or less. The tan δ value is more preferably 1.8 or less, and still more preferably 1.6 or less.

The tan δ value of the lithographic ink of the present invention at 25° C. and 1 (rad/s) is preferably 2.0 or more and 3.0 or less. In order to impart fluidity under low shear to the lithographic ink of the present invention to obtain a printed material having high gloss, the tan δ value at 1 (rad/s) is preferably 2.0 or more. The tan δ value is more preferably 2.2 or more, and still more preferably 2.4 or more. The tan δ value at 1 (rad/s) is preferably 3.0 or less since the threading of the lithographic ink of the present invention can be reduced to suppress the misting of the ink. The tan δ value at 1 (rad/s) is more preferably 2.8 or less, and still more preferably 2.6 or less.

The lithographic ink of the present invention preferably contains a resin having hydrophilic group, and a polyfunctional (meth)acrylate having hydroxyl group. A pigment is favorably dispersed in the ink by the hydrophilic group and the hydroxyl group, so that the structural viscosity of the ink (the pigment forms an aggregated structure to increase the viscosity) is considered to be reduced to lower the viscosity of the ink under low shear. The low viscosity of the ink under low shear is considered to cause the printed material using the lithographic ink of the present invention to exhibit high glossiness. The resin having hydrophilic group is dissolved in the polyfunctional (meth)acrylate having hydroxyl group, to form an interaction such as a hydrogen bond between the hydrophilic group and the hydroxyl group. The interaction causes the viscosity of the resin to increase. The dissolved matter is a Neutonian fluid, and maintains a constant viscosity regardless of a shear strength. In the lithographic ink of the present invention, the viscosity of the dissolved matter as a medium becomes dominant in a high shear region (a rotational speed of 20 rpm or more) after the structural viscosity collapses, so that shear causes small reduction in viscosity, which maintains high viscosity under high shear. As a result, the cohesive force of the ink is high under high shear such as during printing, and the repulsion property of the ink to a non-printing part is improved, so that the surface staining resistance is improved. Examples of the hydrophilic group of the resin having hydrophilic group include a hydroxyl group, an amino group, a mercapto group, a carboxyl group, a sulfo group, and a phosphate group. Among these, a carboxyl group having favorable pigment dispersibility is particularly preferable.

When an acid value of the resin having hydrophilic group is 30 mgKOH/g or more, the pigment dispersibility of the lithographic ink is favorable, and the surface staining resistance is improved, which is preferable. The acid value is more preferably 60 mgKOH/g or more, and still more preferably 75 mgKOH/g or more. When the acid value is 250 mgKOH/g or less, the fluidity of the lithographic ink of the present invention is maintained, which is preferable. The acid value is more preferably 200 mgKOH/g or less, and still more preferably 150 mgKOH/g or less. When the acid value is within the above range, the pigment dispersibility, surface staining resistance, and fluidity of the ink can be favorably maintained. The acid value of the resin having hydrophilic group may be determined according to "3.1 neutralization titration" in the test method of JIS K 0070: 1992.

When a weight average molecular weight of the resin having hydrophilic group is 5,000 or more, the surface staining resistance of the lithographic ink is improved, which is preferable. The weight average molecular weight is more preferably 15,000 or more, and still more preferably 20,000 or more. When the weight average molecular weight is preferably 100,000 or less, the fluidity of the lithographic ink is maintained, which is preferable. The weight average molecular weight is more preferably 75,000 or less, and still more preferably 50,000 or less. The weight average molecular weight of the resin can be determined by a measurement using gel permeation chromatography (GPC) and conducting the calculation in terms of polystyrene.

Examples of the resin having hydrophilic group include, but are not particularly limited to, acrylic resin having carboxyl group, styrene acrylic resin having carboxyl group, styrene maleic acid resin, rosin-modified maleic acid resin, rosin-modified acrylic resin, epoxy resin having hydroxyl group, polyester resin having hydroxyl group or a carboxyl group, polyurethane resin having hydroxyl group or a carboxyl group, and phenol resin. Among the above-mentioned resins, the preferred for the resin having hydrophilic group are acrylic resin having carboxyl group, styrene acrylic resin having carboxyl group, and styrene maleic acid resin in view of availability of the monomer, low cost, easy synthesis, compatibility with other components of the ink, dispersibility of the pigment, and the like.

Among the above-mentioned resins, acrylic resin having carboxyl group, styrene acrylic resin having carboxyl group, and styrene maleic acid resin can be produced by the following method, that is, by polymerizing or copolymerizing a compound selected from a carboxyl group-containing monomer such as acrylic acid, methacrylic acid, itaconic acid, crotonic acid, maleic acid, fumaric acid, or vinyl acetate, a hydroxyl group-containing monomer such as 2-hydroxyethyl acrylate, an amino group-containing monomer such as dimethylaminoethyl methacrylate, a mercapto group-containing monomer such as acrylic acid 2-(mercaptoacetoxy)ethyl, a sulfo group-containing monomer such as acryl amide t-butyl sulfonic acid, a phosphate group-containing monomer such as 2-methacryloyloxy ethyl acid phosphate, and the like using a radical polymerization initiator. In addition to the above monomers, a compound selected from methacrylate, acrylate, styrene, acrylonitrile, and vinyl acetate, and the like can be used as the monomer to be used during copolymerization.

More specifically, examples of the resin having hydrophilic group include (meth)acrylic acid copolymer, (meth)acrylic acid-(meth)acrylate copolymer, styrene-(meth)acrylic acid copolymer, styrene-(meth)acrylic acid-(meth)acrylate copolymer, styrene-maleic acid copolymer, styrene-maleic acid-(meth)acrylic acid copolymer, and styrene-maleic acid-(meth)acrylate copolymer.

The resin having hydrophilic group preferably has an ethylenically unsaturated group in view of improved sensitivity for the curing by the active energy ray. Iodine number of the ethylenically unsaturated group in the resin having hydrophilic group and an ethylenically unsaturated group is preferably 0.5 mol/kg or more and 3.0 mol/kg or less. When the iodine number is within the above range, the sensitivity of the active energy ray-curable lithographic ink to the active energy ray is improved and favorable storage stability is obtained, which is preferable. The iodine number of the ethylenically unsaturated group may be determined according to the method described in 6.0 in the test method of JIS K 0070: 1992.

The resin having hydrophilic group and an ethylenically unsaturated group can be produced by the following method. The addition reaction of the ethylenically unsaturated compound containing glycidyl group or isocyanate group, acrylic acid chloride, methacrylic acid chloride, or allyl chloride to the active hydrogen-containing group in the resin having hydroxyl group (the mercapto group, the amino group, the hydroxy group, or the carboxyl group) provides the resin having hydrophilic group and an ethylenically unsaturated group. The method used, however, is not limited to the method as described above.

Examples of the ethylenically unsaturated compound having glycidyl group include glycidyl acrylate, glycidyl methacrylate, allyl glycidyl ether, glycidyl crotonate, and glycidyl isocrotonate.

Examples of the ethylenically unsaturated compound having an isocyanate group include acryloyl isocyanate, methacryloyl isocyanate, acryloyl ethyl isocyanate, and methacryloyl ethyl isocyanate.

When the lithographic ink of the present invention contains the resin having hydrophilic group in an amount of 5% by mass or more, the pigment dispersibility and surface staining resistance of the ink can be favorably maintained, which is preferable. The content of the resin having hydrophilic group is more preferably 8% by mass or more, and still more preferably 10% by mass or more. When the lithographic ink contains the resin having hydrophilic group in an amount of 50% by mass or less, the fluidity of the lithographic ink is maintained, which is preferable. The content of the resin having hydrophilic group is more preferably 30% by mass or less, and still more preferably 20% by mass or less.

When a hydroxyl value of the polyfunctional (meth)acrylate having hydroxyl group is 50 mgKOH/g or more, the pigment dispersibility of the ink is improved, which is preferable. The hydroxyl value of the polyfunctional (meth)acrylate having hydroxyl group is more preferably 75 mgKOH/g or more, and still more preferably 100 mgKOH/g or more. When the hydroxyl value of the polyfunctional (meth)acrylate having hydroxyl group is 200 mgKOH/g or less, the fluidity of the ink can be favorably maintained, which is preferable. The hydroxyl value of the polyfunctional (meth)acrylate having hydroxyl group is more preferably 180 mgKOH/g or less, and still more preferably 160 mgKOH/g or less.

When a weight average molecular weight of the polyfunctional (meth)acrylate having hydroxyl group is 100 or more, the surface staining resistance of the lithographic ink is improved, which is preferable. The weight average molecular weight of the polyfunctional (meth)acrylate having hydroxyl group is more preferably 150 or more, and still more preferably 200 or more. When the weight average molecular weight of the polyfunctional (meth)acrylate having hydroxyl group is 1,000 or less, the fluidity of the lithographic ink is maintained, which is preferable. The weight average molecular weight of the polyfunctional (meth)acrylate having hydroxyl group is more preferably 750 or less, and still more preferably 500 or less. The weight average molecular weight of the polyfunctional (meth)acrylate having hydroxyl group can be determined by a measurement using gel permeation chromatography (GPC) and conducting the calculation in terms of polystyrene.

Preferable examples of the polyfunctional (meth)acrylate having hydroxyl group include a poly(meth)acrylate of a polyhydric alcohol such as trimethylolpropane, glycerin, pentaerythritol, diglycerin, ditrimethylolpropane, isocyanuric acid and dipentaerythritol, and alkylene oxide adducts thereof. More specific examples include di(meth)acrylate of trimethylolpropane, di(meth)acrylate of glycerin, di or tri(meth)acrylate of pentaerythritol, di or tri(meth)acrylate of diglycerin, di or tri(meth)acrylate of ditrimethylolpropane, di, tri, tetra, or penta(meth)acrylate of dipentaerythritol, and ethylene oxide adducts, propylene oxide adducts, and tetraethylene oxide adducts thereof. Among them, particularly preferred are tri(meth)acrylate of pentaerythritol, tri(meth)acrylate of diglycerin, and tri(meth)acrylate of ditrimethylolpropane, since the lithographic ink of the present invention has superior fluidity and pigment dispersibility, and improved surface staining resistance.

When the lithographic ink of the present invention contains the polyfunctional (meth)acrylate having hydroxyl group in an amount of 20% by mass or more, the pigment dispersibility of the ink is improved, which is preferable. The content of the polyfunctional (meth)acrylate having hydroxyl group is more preferably 30% by mass or more, and still more preferably 40% by mass or more. The content of the polyfunctional (meth)acrylate having hydroxyl group is 70% by mass or less, since the fluidity of the ink can be favorably maintained. The content of the polyfunctional (meth)acrylate having hydroxyl group is more preferably 60% by mass or less, and still more preferably 50% by mass or less.

Examples of polyfunctional (meth)acrylate other than the polyfunctional (meth)acrylate having hydroxyl group may include difunctional (meth)acrylates including (meth)acrylate compounds prepared from dihydric alcohol, glycol, and the like such as ethyleneglycol di(meth)acrylate, diethylene glycol di(meth)acrylate, triethylene glycol di(meth)acrylate, polyethylene glycol di(meth)acrylate, tripropylene glycol di(meth)acrylate, 1,3 butylene glycol di(meth)acrylate, 1,6 hexanediol di(meth)acrylate, 1,9 nonanediol di(meth)acrylate, and neopentylglycol di(meth)acrylate; trifunctional (meth)acrylates including (meth)acrylate compounds prepared from trihydric alcohol, glycol, and the like such as trimethylolpropane tri(meth)acrylate, glycerin tri(meth)acrylate, and isocyanuric acid tri(meth)acrylate as well as ethylene oxide adducts and propylene oxide adducts thereof; tetrafunctional (meth)acrylates including (meth)acrylate compounds prepared from tetrahydric alcohol, glycol, and the like such as pentaerythritol tetra(meth)acrylate, ditrimethylolpropane tetra(meth)acrylate, and diglycerin tetra(meth)acrylate as well as ethylene oxide adducts and propylene oxide adducts thereof; and pentafunctional (meth)acrylates including (meth)acrylate compounds prepared from pentahydric or higher alcohol, glycol, and the like such as dipentaerythritol hexa(meth)acrylate as well as ethylene oxide adducts and propylene oxide adducts thereof. Among them, particularly preferred are ethylene oxide adducts of trimethylolpropane tri(meth)acrylate, ethylene oxide adducts of pentaerythritol tetra(meth)acrylate, ethylene oxide adducts of diglycerin tetra(meth)acrylate, and ethylene oxide adducts of ditrimethylolpropane tetra(meth)acrylate having low viscosity and high sensitivity.

When the lithographic ink of the present invention contains the polyfunctional (meth)acrylate other than the polyfunctional (meth)acrylate having hydroxyl group in an amount of 5% by mass or more, the viscosity of the lithographic ink decreases, which is preferable. The content of the polyfunctional (meth)acrylate other than the polyfunctional (meth)acrylate having hydroxyl group is more preferably 10% by mass or more, and still more preferably 15% by mass or more. The content of the polyfunctional (meth)acrylate other than the polyfunctional (meth)acrylate having hydroxyl group is preferably 40% by mass or less, since the viscosity of the lithographic ink does not excessively decrease. The content of the polyfunctional (meth)acrylate other than the polyfunctional (meth)acrylate having hydroxyl group is more preferably 35% by mass or less, and still more preferably 30% by mass or less.

It is preferable that the lithographic ink of the present invention contains a photopolymerization initiator which generates active radical species, and has active energy ray curability.

Examples of the photopolymerization initiator include benzophenone, o-benzoyl methyl benzoate, 4,4-bis(dimethylamino)benzophenone (alias name: Michler's ketone), 4,4-bis(diethylamino)benzophenone, 4,4-dichlorobenzophenone, 4-benzoyl-4-methyl diphenyl ketone, 1-hydroxycyclohexyl-phenyl ketone, 4-phenyl benzophenone, hydroxy benzophenone, dibenzyl ketone, fluorenone, 2,2-diethoxyacetophenone, 2,2-dimethoxy-2-phenyl-2-phenylacetophenone, 2-hydroxy-2-methyl-1-phenylpropan-1-one, 1-[4-(2-hydroxyethoxy)-phenyl]-2-hydroxy-2-methyl-1-propan-1-one, p-t-butyl dichloroacetophenone, 2,4,6-trimethylbenzoyl-diphenyl-phosphine oxide, 2,6-dimethylbenzoyl-diphenyl-phosphine oxide, 2,6-dimethoxylbenzoyl-diphenyl-phosphine oxide, benzoyl-diphenyl-phosphine oxide, 2,4,6-trimethylbenzoyl-bis(4-methoxyphenyl)phosphine oxide, 2,6-dimethylbenzoyl-bis(4-methoxyphenyl)phosphine oxide, 2,6-dimethoxybenzoyl-bis(4-methoxyphenyl)phosphine oxide, 2,4,6-trimethylbenzoyl-4-methoxyphenyl-phenyl-phosphine oxide, 2,6-dimethylbenzoyl-4-methoxyphenyl-phenyl-phosphine oxide, 2,6-dimethoxybenzoyl-4-methoxyphenyl-phenyl-phosphine oxide, 2,4,6-trimethylbenzoyl-dicyclohexyl-phosphine oxide, 2,6-dimethylbenzoyl-dicyclohexyl-phosphine oxide, 2,6-dimethoxybenzoyl-dicyclohexyl-phosphine oxide, benzoyl-bis(2,4,6-trimethylphenyl)phosphine oxide, bis(2,4,6-trimethylbenzoyl)-phenyl-phosphine oxide, bis(2,6-dimethylbenzoyl)-phenyl-phosphine oxide, bis(2,6-dimethoxybenzoyl)-phenyl-phosphine oxide, bis(2,4,6-trimethylbenzoyl)-2,4,4-trimethylpentyl-phosphine oxide, bis(2,6-dimethoxybenzoyl)-2,4,4-trimethylpentyl-phosphine oxide, bis(2,6-dimethylbenzoyl)-2,4,4-trimethylpentyl-phosphine oxide, thioxanthone, 2-methylthioxanthone, 2-chlorothioxanthone, 2-isopropylthioxanthone, diethylthioxanthone, dichlorothioxanthone, benzyl, benzyldimethylketanol, benzylmethoxyethylacetal, benzoin, benzoin methyl ether, benzoin butyl ether, anthraquinone, 2-t-butyl anthraquinone, 2-amylanthraquinone, 3-chloroanthraquinone, anthrone, benzanthrone, dibenzosuberone, methyleneanthrone, 4-azidobenzal acetophenone, 2,6-bis(p-azidobenzylidene)cyclohexanone, 2,6-bis(p-azidobenzylidene)-4-methylcyclohexanone, 2-phenyl-1,2-butadione-2-(o-methoxycarbonyl)oxime, 1-phenyl-propanedione-2-(o-ethoxycarbonyl)oxime, 1,3-diphenyl-propanetrione-2-(o-ethoxycarbonyl)oxime, 1-phenyl-3-ethoxy-propanetrione-2-(o-benzoyl)oxime, 2-methyl-[4-(methylthio)phenyl]-2-morpholino-1-propanone, 2-benzyl-2-dimethylamino-1-(4-morpholinophenyl)-butanone, naphthalenesulfonyl chloride, quinolinesulfonyl chloride, N-phenylthioacridone, 4,4-azobisisobutyronitrile, diphenyl disulfide, benzthiazole disulfide, and triphenylphosphine.

When the lithographic ink of the present invention contains the photopolymerization initiator in an amount of 0.1% by mass or more, the lithographic ink has favorable sensitivity, which is preferable. The lithographic ink contains the photopolymerization initiator in an amount of more preferably 1% by mass or more, and still more preferably 3% by mass or more. When the lithographic ink contains the photopolymerization initiator in an amount of 20% by mass or less, the storage stability of the lithographic ink is improved, which is preferable. The lithographic ink contains the photopolymerization initiator in an amount of more preferably 15% by mass or less, and still more preferably 10% by mass or less.

The lithographic ink of the present invention can contain a sensitizing agent. Examples of the sensitizing agent include 2-methylthioxanthone, 2-chlorothioxanthone, 2,4-diethylthioxanthone, isopropylthioxanthone, 2,4-dichlorothioxanthone, 2,3-bis(4-diethylaminobenzal)cyclopentanone, 2,6-bis (4-dimethylaminobenzal)cyclohexanone, 2,6-bis(4-dimethylaminobenzal)-4-methylcyclohexanone, 4,4-bis(dimethylamino)-benzophenone (alias name: Michler's ketone), 4,4-bis(diethylamino)-benzophenone, 4,4-bis(dimethylamino)chalcone, 4,4-bis(diethylamino) chalcone, p-dimethylaminocinnamylidene indanone, p-dimethylaminobenzylidene indanone, 2-(p-dimethylaminophenylvinylene)-isonaphthothiazole, 1,3-bis(4-dimethylaminobenzal)acetone, 1,3-carbonyl-bis(4-diethylaminobenzal)acetone, 3,3-carbonyl-bis(7-diethylaminocoumarin), N-phenyl-N-ethylethanolamine, N-phenylethanolamine, N-tolyldiethanolamine, isoamyl dimethylaminobenzoate, isoamyl diethylaminobenzoate, methyl diethylaminobenzoate, ethyl diethylaminobenzoate, isoamyl diethylaminobenzoate, 3-phenyl-5-benzoylthiotetrazole, and 1-phenyl-5-ethoxycarbonyl thiotetrazole.

When the lithographic ink of the present invention contains the sensitizing agent in an amount of 0.1% by mass or more, the lithographic ink has favorable sensitivity, which is preferable. The lithographic ink contains the sensitizing agent in an amount of more preferably 1% by mass or more, and more preferably 3% by mass or more. The lithographic ink contains the sensitizing agent in an amount of preferably 20% by mass or less, since the storage stability of the lithographic ink is improved. The lithographic ink contains the sensitizing agent in an amount of more preferably 15% by mass or less, and still more preferably 10% by mass or less.

The lithographic ink of the present invention can contain at least one of the photopolymerization initiators and the sensitizing agents.

The lithographic ink of the present invention preferably contains at least one component selected from fluid silicone, alkyl(meth)acrylate, vegetable oil, fatty acid ester from vegetable oil, hydrocarbon solvent, and fluorocarbon.

The components have the effect of suppressing adhesion of the ink to the silicone rubber which is the non-printing part in the waterless lithography plate. Presumably, the adhesion of the ink to the silicone rubber is suppressed as follows. That is, the components in the ink diffuse from the ink upon contact of the components in the ink with the silicone rubber surface, and cover the silicone rubber surface in the form of a thin film. It is presumed that the thin film thus formed prevents the adhesion of the ink to the surface of the silicone rubber to prevent the surface staining of the silicone surface.

When the lithographic ink of the present invention has active energy ray curability, the alkyl(meth)acrylate among the components is cured with the irradiation of the active energy ray, namely, since it improves sensitivity to the active energy ray simultaneously with the improvement in the film physical properties of the cured film, so that the alkyl(meth)acrylate is preferably contained in the lithographic ink of the present invention.

Typical compounds used for the components are as described below.

Examples of the silicone fluids include dimethyl silicone, methylphenylsilicone, alkyl-modified silicone, polyether-modified silicone, aralkyl-modified silicone, fatty acid amide-modified silicone, fatty acid ester-modified silicone, fluoroalkyl-modified silicone, methyl hydrogen silicone, silanol-modified silicone, alcohol-modified silicone, amino-modified silicone, epoxy-modified silicone, epoxy polyether-modified silicone, phenol-modified silicone, carboxy-modified silicone, and mercapto-modified silicone.

Examples of the alkyl(meth)acrylates include nonyl (meth)acrylate, decyl(meth)acrylate, undecyl(meth)acrylate, dodecyl(meth)acrylate, tridecyl(meth)acrylate, tetradecyl (meth)acrylate, pentadecyl(meth)acrylate, hexadecyl(meth) acrylate, heptadecyl(meth)acrylate, octadecyl(meth)acrylate, and isooctadecyl(meth)acrylate. The alkyl(meth) acrylate has an alkyl group having carbon atoms of preferably 5 to 24, and more preferably 6 to 21.

Examples of the vegetable oils include soybean oil, linseed oil, safflower oil, tung oil, tall oil, and dehydrated castor oil.

Examples of the fatty acid esters from vegetable oil include esters of a fatty acid having an alkyl backbone containing about 15 to 20 carbon atoms such as stearic acid, isostearic acid, hydroxystearic acid, oleic acid, linoleic acid, linolenic acid, or eleostearic acid with an alkyl containing about 1 to 10 carbon atoms such as methyl, ethyl, propyl, isopropyl, butyl, isobutyl, tert-butyl, or 2-ethylhexyl.

Examples of the hydrocarbon solvents include polyolefin oil, naphthene oil, and paraffin oil.

Examples of the fluorocarbons include 1,1,1,2,2-pentafluoroethane, 1,1,1,2,2,3,3,4,4-nonafluorobutane, 1,1,1,2,2,3,3,4,4,5,5,6,6-tridecafluorohexane, 1,1,1,2,2,3,3,4,4,5,5,6,6,7,7,8,8-heptadecafluorooctane, 1,1,1,2,3,3,3-heptafluoropropane, 1,1,1,2,3,3,4,4-octafluoro-2-trifluoromethylbutane, 1,1,1,2,3,3,4,4,5,5,6,6-dodecafluoro-2-trifluoromethyl hexane, 1,1,2,2-tetrafluoroethane, 1,1,2,2,3,3,4,4-octafluorobutane, and 1,1,2,2,3,3,4,4,5,5,6,6-dodecafluorohexane.

In view of improving the surface staining resistance, the lithographic ink of the present invention preferably contains at least one component selected from the silicone fluid, alkyl(meth)acrylate, vegetable oil, fatty acid ester from vegetable oil, hydrocarbon solvent, and fluorocarbon. The total content thereof is preferably 0.5% by mass or more. The total content is more preferably 1% by mass or more, and still more preferably 2% by mass or more. The total content is preferably 10% by mass or less since the storage stability of the lithographic ink can be improved. The total content is more preferably 8% by mass or less, and still more preferably 5% by mass or less.

The lithographic ink of the present invention preferably contains a surfactant. When the lithographic ink contains the surfactant, the lithographic ink takes in an appropriate amount of wetting water during water lithography, for example, 10 to 20% by mass of the total amount of the ink for emulsification, repellency of the non-printing part against the wetting water increases to thereby improve the surface staining resistance of the ink.

The ratio of the hydrophilic group to the hydrophobic group in the surfactant is represented by HLB value. The "HLB value" as used herein is a value indicating the degree of the affinity with water and oil of the surfactant. This HLB value may be a value of 0 to 20, and the value near 0 represents a higher oleophilicity while a value near 20 represents a higher hydrophilicity. The HLB value of the surfactant is preferably 8 or more in view of dissolving water. The HLB value is more preferably 10 or more. The HLB value is preferably 18 or less in view of dissolving in the lithographic ink. The HLB value is more preferably 16 or less.

Examples of the surfactant include polyoxyethylene alkyl ether, polyoxyethylene lauryl ether, polyoxyethylene oleyl ether, polyoxyethylene stearyl ether, polyoxyethylene cetyl ether, polyoxyethylene palmityl ether, polyoxypropylene alkyl ether, polyoxypropylene lauryl ether, polyoxypropylene oleyl ether, polyoxypropylene stearyl ether, polyoxypropylene cetyl ether, polyoxypropylene palmityl ether, polyoxyalkylene alkyl ether, polyoxyalkylene lauryl ether, polyoxyalkylene oleyl ether, polyoxyalkylene stearyl ether, polyoxyalkylene cetyl ether, and polyoxyalkylene palmitylether; mono-, di-, and tri-alkyl ether of sorbitan acid, mono-, di-, and tri-lauryl ether of sorbitan acid, mono-, di-, and tri-oleyl ether of sorbitan acid, mono-, di-, and tri-stearyl ether of sorbitan acid, mono-, di-, and tri-cetyl ether of sorbitan acid, mono-, di-, and tri-palmityl ether of sorbitan acid; mono-, di-, and tri-alkyl ether of polyoxyethylene of sorbitan acid, mono-, di-, and tri-lauryl ether of polyoxyethylene of sorbitan acid, mono-, di-, and tri-oleyl ether of polyoxyethylene of sorbitan acid, mono-, di-, and tri-stearyl ether of polyoxyethylene of sorbitan acid, mono-, di-, and tri-cetyl ether of polyoxyethylene of sorbitan acid, and mono-, di-, and tri-palmityl ether of polyoxyethylene of sorbitan acid; and polyether-modified silicone oil. The preferred for use are those having a HLB value of 8 or more and 18 or less.

In view of the intake of the wetting water in the course of water lithography and stabilization of the emulsification state, the content of the surfactant in the lithographic ink of the present invention is 0.01% by mass or more. The content of the surfactant is more preferably 0.05% by mass or more, and still more preferably 0.1% by mass or more. In view of the excessive intake of the wetting water in the lithographic ink during the water lithography and incompatibility with wetting water of the lithographic ink, the content of the surfactant is preferably 5% by mass or less. The content of the surfactant is more preferably 3% by mass or less, and still more preferably 1% by mass or less.

As the pigment contained in the lithographic ink of the present invention, at least one pigment selected from inorganic pigments and organic pigments generally used in a lithographic ink composition can be used.

Examples of the inorganic pigment used in the present invention include titanium dioxide, calcium carbonate, barium sulfate, iron red, cadmium red, chrome yellow, zinc yellow, Prussian blue, ultramarine, organic bentonite, alumina white, iron oxide, carbon black, graphite, and aluminum.

Examples of the organic pigment include phthalocyanine pigments, soluble azo pigments, insoluble azo pigments, lake pigments, quinacridone pigments, isoindoline pigments, threne pigment, metal complex pigments, and more specifically, phthalocyanine blue, phthalocyanine green, azo red, monoazo red, monoazo yellow, diazo red, diazo yellow, quinacridone red, quinacridone magenta, and isoindoline yellow.

The concentration of the pigment contained in the lithographic ink of the present invention is preferably 5% by mass or more in order to obtain an intended printed paper surface concentration. The content of the pigment is more preferably 10% by mass or more, and still more preferably 15% by mass or more. In order to improve the fluidity of the ink to obtain a favorable transfer property between rollers, the concentration of the pigment is preferably 50% by mass or less. The concentration of the pigment is more preferably 40% by mass or less, and still more preferably 30% by mass or less.

A polymerization inhibitor is preferably added to the lithographic ink of the present invention in order to improve the stability of the lithographic ink during storage. Examples of the polymerization inhibitor include hydroquinone, monoether of hydroquinone, N-nitrosodiphenylamine, phenothiazine, p-t-butylcatechol, N-phenylnaphthylamine, 2,6-di-t-butyl-p-methyl phenol, chloranil, and pyrogallol. The addition amount of the polymerization inhibitor is preferably 0.01% by mass or more and 5% by mass or less in relation to the lithographic ink since favorable storage stability is obtained.

The lithographic ink of the present invention preferably contains a pigment dispersant in order to improve the dispersibility of the pigment. The optimum content of the pigment dispersant varies depending on the density, particle diameter, and surface area and the like of the pigment to be used, but the pigment dispersant acts on the surface of the pigment to suppress the aggregation of the pigment. This improves the pigment dispersibility to improve the fluidity of the lithographic ink.

Examples of the pigment dispersant include 101, 102, 103, 106, 108, 109, 110, 111, 112, 116, 130, 140, 142, 145, 161, 162, 163, 164, 166, 167, 168, 170, 171, 174, 180, 182, 183, 184, 185, 2000, 2001, 2020, 2050, 2070, 2096, 2150, 2152 and 9076 of wet dispersant DISPER BYK series commercially available from BYK; 1210, 1220, 1831, 1850, 1860, 2100, 2150, 2200, 7004, KS-260, KS-273N, KS-860, KS-873N, PW-36, DN-900, DA-234, DA-325, DA-375, DA-550, DA-1200, DA-1401 and DA-7301 of "DISPARLON" (registered trademark) series commercially available from Kusumoto Chemicals, Ltd.; 4008, 4009, 4010, 4015, 4020, 4046, 4047, 4050, 4055, 4060, 4080, 4300, 4330, 4340, 4400, 4401, 4402, 4403, 4406, 4800, 5010, 5044, 5054, 5055, 5063, 5064, 5065, 5066, 5070, 5244, 7701, 7731 and 7469 of EFKA series commercially available from BASF; 3000, 11200, 13240, 13650, 13940, 16000, 17000, 18000, 20000, 21000, 24000SC, 24000GR, 26000, 28000, 31845, 32000, 32500, 32550, 32600, 33000, 34750, 35100, 35200, 36000, 36600, 37500, 38500, 39000, 41000, 53095, 54000, 55000, 56000 and 71000 of "SOLSPERSE" (registered trademark) series commercially available from Lubrizol Advanced Materials, Inc.; 104A, 104C, 104E, 104H, 104S, 104BC, 104DPM, 104PA, 104PG-50, 420, 440, DF110D, DF110L, DF37, DF58, DF75, DF210, CT111, CT121. CT131, CT136, GA, TG and TGE of "SURFYNOL" (registered trademark) series commercially available from Air Products and Chemicals, Inc.; PB-711, PB-821, PB-822, PN-411 and PA-111 of "AJISUPAR" (registered trademark) series commercially available from Ajinomoto Fine Techno Co., Ltd.; and "SANNONIC" (registered trademark) series, "NAROACTY" (registered trademark) CL series, "EMULMIN" (registered trademark) series, "NEW-POL (registered trademark) PE series, "IONET" (registered trademark) M series, "IONET" (registered trademark) D series, "IONET" (registered trademark) S series, "IONET (registered trademark) T series, and "SANSEPARER" (registered trademark) 100 commercially available from Sanyo Chemical Industries, Ltd.

The content of the pigment dispersant is preferably 5% by mass or more and 50% by mass or less in relation to the pigment since the fluidity of the lithographic ink is improved.

The lithographic ink of the present invention may also contain additives such as wax, defoaming agent or transfer improving agent as required.

The method for manufacturing the lithographic ink of the present invention will be described. The lithographic ink of the present invention is obtained by homogeneously mixing and dispersing a pigment, an additive, and other components with an agitator or kneader such as kneader, three roll mill, ball mill, planetary ball mill, beads mill, roll mill, attriter, sand mill, gate mixer, paint shaker, homogenizer, or planetary centrifugal mixer. Optional defoaming under vacuum or reduced pressure after or during the mixing and dispersion is also preferable.

The method for manufacturing a printed material using the lithographic ink of the present invention will be described. The lithographic ink of the present invention is applied onto a substrate, so that a printed material can be obtained.

Examples of the substrate include, but are not limited to, art paper, coated paper, cast paper, synthetic paper, newsprint paper, aluminum vapor deposited paper, metal, and a plastic film made of polypropylene or polyethylene terephthalate. These substrates can be used in both of a sheet form (sheet shape) and a roll form, and it is preferable that the thickness of the substrate is 50 to 500 μm in the sheet form and 10 to 200 μm in the roll form.

As the method for applying the lithographic ink of the present invention onto the substrate, the lithographic ink can be applied onto the substrate by lithography. Both of water lithographic system and waterless lithographic system can be used.

The thickness of the ink coated film (cured film) on the printed material is preferably 0.1 to 50 μm. When the thickness of the ink coated film is within the above range, it is possible to reduce ink cost while maintaining favorable print quality.

When the lithographic ink of the present invention has active energy ray curability, the ink coated film on the printed material can be instantly cured by irradiating an active energy ray. The active energy ray used may be any ray as long as the ray has an excited energy necessary for the curing reaction, and examples preferably include UV and electron rays. When the curing is conducted by using an electron ray, an electron ray apparatus emitting an energy ray of 100 to 500 eV is preferably used. In the case of the curing using UV, use of a UV irradiation apparatus such as high pressure mercury lamp, xenon lamp, metal halide lamp, or light emitting diode is preferable. When a metal halide lamp is used, the preferred is curing by using a lamp having an illuminance of 80 to 150 W/cm at a conveyer speed of 50 to 150 m/min in view of the productivity. In the case of using a light emitting diode emitting a bright line having a wavelength of 350 to 420 nm, curing is preferably performed by using a light emitting diode having an irradiation intensity of 5 to 20 W/cm$^2$ at a conveying speed of a conveyer of 50 to 150 m/min in view of power saving and cost reduction in addition to productivity.

EXAMPLES

Hereinafter, the present invention will be specifically described with reference to Examples. However, the present invention is not limited thereto.

<Starting Materials for Ink>

Resin 1: A copolymer was prepared which contained 25% by mass of methyl methacrylate, 25% by mass of styrene, and 50% by mass of methacrylic acid. 0.55 equivalent weight of glycidyl methacrylate was reacted (addition reaction) with a carboxyl group of the copolymer to obtain a resin 1 having an ethylenically unsaturated group and a hydrophilic group. The obtained resin 1 had a weight average molecular weight of 34,000, an acid value of 102 mgKOH/g, and an iodine number of 2.0 mol/kg.

Resin 2: A copolymer was prepared which contained 30% by mass of methyl methacrylate, 25% by mass of styrene, and 45% by mass of methacrylic acid. 0.7 equivalent weight of glycidyl methacrylate was reacted (addition reaction) with a carboxyl group of the copolymer to obtain a resin 2 having an ethylenically unsaturated group and a hydrophilic group. The obtained resin 2 had a weight average molecular weight of 25,000, an acid value of 70 mgKOH/g, and an iodine number of 2.4 mol/kg.

Resin 3: A resin 3 was obtained which contained 50% by mass of methyl methacrylate, 30% by mass of styrene, and 20% by mass of methacrylic acid, and had a hydrophilic group. The obtained resin 3 had a weight average molecular weight of 51,000, an acid value of 125 mgKOH/g, and an iodine number of 0 mol/kg.

Resin 4: A resin 4 was obtained which contained 20% by mass of methyl methacrylate, 40% by mass of styrene, and 40% by mass of methacrylic acid, and had a hydrophilic group. The obtained resin 4 had a weight average molecular weight of 39,000 and an acid value of 260 mgKOH/g.

Resin 5: A resin 5 was obtained which contained 67% by weight of methyl methacrylate, 25% by mass of styrene, and 8% by mass of methacrylic acid, and had a hydrophilic group. The obtained resin 5 had a weight average molecular weight of 66,000 and an acid value of 45 mgKOH/g.

Resin 6: A copolymer was prepared which contained 25% by mass of methyl methacrylate, 25% by mass of styrene, and 50% by mass of methacrylic acid. 0.9 equivalent weight of glycidyl methacrylate was reacted (addition reaction) with a carboxyl group of the copolymer to obtain a resin 6 having an ethylenically unsaturated group and a hydrophilic group. The obtained resin 6 had a weight average molecular weight of 39,000, an acid value of 20 mgKOH/g, and an iodine number of 2.9 mol/kg.

Resin 7: A copolymer was prepared which contained 30% by mass of methyl methacrylate, 25% by mass of styrene, and 45% by mass of methacrylic acid. 0.1 equivalent weight of glycidyl methacrylate was reacted (addition reaction) with a carboxyl group of the copolymer to obtain a resin 7 having an ethylenically unsaturated group and a hydrophilic group. The obtained resin 7 had a weight average molecular weight of 24,000, an acid value of 245 mgKOH/g, and an iodine number of 0.4 mol/kg.

Resin 8: A copolymer was prepared which contained 30% by mass of methyl methacrylate, 20% by mass of styrene, and 50% by mass of methacrylic acid. 0.3 equivalent weight of glycidyl methacrylate was reacted (addition reaction) with a carboxyl group of the copolymer to obtain a resin 8 having an ethylenically unsaturated group and a hydrophilic group. The obtained resin 8 had a weight average molecular weight of 27,000, an acid value of 180 mgKOH/g, and an iodine number of 1.4 mol/kg.

Resin 9: A copolymer was prepared which contained 25% by mass of methyl methacrylate, 2% by mass of styrene, and 50% by mass of methacrylic acid. 1.0 equivalent of glycidyl methacrylate was reacted (addition reaction) with a carboxyl group of the copolymer to obtain a resin 9 having an ethylenically unsaturated group and a hydrophilic group. The obtained resin 9 had a weight average molecular weight of 41,000, an acid value of 0 mgKOH/g, and an iodine number of 3.2 mol/kg.

Resin 10: "DAISO ISO-DAP" (manufactured by Daiso Co., Ltd., diallyl phthalate resin having no hydrophilic group with a weight average molecular weight of 30,000 and an acid value of 0 mgKOH/g).

Polyfunctional (meth)acrylate 1: a mixture of pentaerythritol triacrylate and pentaerythritol tetraacrylate "Miramer" (registered trademark) M340 (manufactured by MIWON) having hydroxyl group with a hydroxyl value of 115 mgKOH/g.

Polyfunctional (meth)acrylate 2: a mixture of pentaerythritol triacrylate and pentaerythritol tetraacrylate "ARONIX" (registered trademark) M-306 (manufactured by TOAGOSEI Co., Ltd.) having hydroxyl group with a hydroxyl value of 171 mgKOH/g.

Polyfunctional (meth)acrylate 3: a mixture of ditrimethylolpropane triacrylate and ditrimethylolpropane tetraacrylate, having hydroxyl group with a hydroxyl value of 72 mgKOH/g.

Polyfunctional (meth)acrylate 4: glycerin dimethacrylate "NK ester" (registered trademark) 701 (manufactured by Shin-Nakamura Chemical Co., Ltd.) having hydroxyl group with a hydroxyl value of 240 mgKOH/g.

Polyfunctional (meth)acrylate 5: a mixture of dipentaerythritol pentaacrylate and dipentaerythritol hexaacrylate "ARONIX" (registered trademark) M-402 (manufactured by TOAGOSEI Co., Ltd.) having hydroxyl group with a hydroxyl value of 28 mgKOH/g.

Polyfunctional (meth)acrylate 6: a mixture of diglycerin triacrylate and diglycerin tetraacrylate, having hydroxyl group with a hydroxyl value of 86 mgKOH/g.

Polyfunctional (meth)acrylate 7: a pentaerythritol tetraacrylate adduct with ethylene oxide "Miramer" (registered trademark) M4004 (manufactured by MIWON) having no hydroxyl group.

Other Additives

Polymerization inhibitor: p-methoxyphenol (manufactured by Wako Pure Chemical Industries, Ltd.)

Pigment: Lionol Blue FG7330 (manufactured by TOYOCOLOR CO., LTD.)

Photopolymerization initiator 1: "Irgacure" (registered trademark) 907 (manufactured by BASF)

Photopolymerization initiator 2: "Irgacure" (registered trademark) 819 (manufactured by BASF)

Additive: Lauryl acrylate "Miramer" (registered trademark) M120 (manufactured by MIWON)

Surfactant 1: "Rheodol" (registered trademark) TW-L120 (manufactured by Kao Corporation) with an HLB value of 16.7

Surfactant 2: "Rheodol" (registered trademark) TW-S106V (manufactured by Kao Corporation) with an HLB value of 9.6

Surfactant 3: "Rheodol" (trademark registered) SP-S10 V (manufactured by Kao Corporation) with an HLB value of 4.7

<Measurement of Weight Average Molecular Weight>

The weight average molecular weight of the resin is a value measured at a column temperature of 40° C. by gel permeation chromatography (GPC) using tetrahydrofuran for the mobile phase. The column used was Shodex KF-803, and the weight average molecular weight was calculated in terms of polystyrene.

<Waterless Printing Test>

A waterless lithography plate (TAN-E manufactured by Toray Industries, Inc.) was mounted on an offset press (Oliver 266EPZ manufactured by SAKURAI GRAPHIC SYSTEMS CORPORATION), and 5000 coated papers were printed by using each of inks of Examples 1 to 20 and Comparative Examples 1 and 2.

<Water Printing Test>

A water lithography plate (XP-F manufactured by FUJIFILM Corporation) was mounted on an offset press (Oliver 266EPZ manufactured by SAKURAI GRAPHIC SYSTEMS CORPORATION), and 5000 coated papers were printed with each of inks of Examples 21 to 24 using tap water containing wetting water and 3% by weight of an etching solution (SOLAIA-505, manufactured by T & K TOKA).

<Evaluation Methods>

(1) Viscosity

A cone plate (cone angle: 10, φ: 40 mm) was mounted on Rheometer MCR301 manufactured by Anton Paar, and the viscosity at each of 0.5 rpm, 20 rpm, 50 rpm, and 80 rpm and 25° C. was measured for 0.15 ml of the ink weighed by an ink pipette.

(2) Measurement of Dynamic Viscoelasticity

The dynamic viscoelasticity of the ink was measured by using Rheometer MCR301 manufactured by Anton Paar. The measurement conditions are as follows.

Sample amount: 0.1 ml
Plate: Parallel plate (φ: 25 mm)
Strain: 2%
Measurement frequency: 1 to 500 rad/s
Measurement temperature range: Measured at 11 points by 5° C. at −25° C. to 25° C.

Using the obtained measurement results, tan δ at 1 to 10000 rad/s and a reference temperature of 25° C. was obtained from a master curve produced according to the temperature time conversion rule. When tan δ is 2.0 or less at 1000 rad/s, the ink has high elasticity and favorable surface staining resistance. When tan δ is 1.5 or less, the ink has extremely superior surface staining resistance. When tan δ is 2.0 or more and 3.0 or less at 1 rad/s, the ink has favorable fluidity, and the printed material exhibits high gloss.

(3) Surface Staining Concentration

Cyan density in the non-printing part of the printed material was evaluated for the case when the cyan density in the solid part of the printed material was 2.0 by using a reflection densitometer (SpectroEye manufactured by GretagMacbeth). The surface staining resistance was inferior when the reflection density was in excess of 0.15, good when the reflection density was 0.10 or less, and excellent when the reflection density was 0.05 or less.

(4) Gloss

An ink cured film on the printed material was measured for its gross value at a measurement angle of 60° by using a precision gloss meter GM-26D (manufactured by MURAKAMI COLOR RESEARCH LABORATORY). The gloss was evaluated poor when the gloss value was 25 or less, good when the gloss value was 30 or more, and excellent when the gloss value was 35 or more.

(5) Misting Property 1.5 ml of the ink was spread on an inkometer (manufactured by Tester Sangyo Co., Ltd.). In a state where white paper was placed immediately below a roll, the roll was rotated at 1200 rpm and a roll temperature of 38° C. for 1 minute. The degrees of scattering of the ink onto the paper were randomly measured at 10 points with a densitometer (manufactured by Gretag Macbeth), and the average value thereof was calculated and evaluated. The misting property was good when the concentration is 0.03 or less.

(6) Active Energy Ray Curability 0.2 g of the ink was transferred to paper by using RI tester (PI-600 manufactured by Tester Sangyo Co., Ltd.). The paper was irradiated with UV by using a UV irradiation apparatus manufactured by USHIO (120 W/cm, one ultrahigh metal halide lamp) under the condition of a belt conveyer speed of 0 to 150 m/min. The belt conveyer speed was determined when the ink on the printed material became sufficiently cured such that the ink was no longer peelable when a cellophane adhesive tape ("Sellotape" (Registered Trademark) No. 405) was adhered onto the coated paper and then peeled from the coated paper. In this case, higher belt conveyer speed indicates higher sensitivity since the curing can be accomplished with reduced exposure. The sensitivity was evaluated insufficient when the belt conveyer speed was less than 60 m/min, good when the belt conveyer speed was 60 m/min or more and less than 100 m/min, and excellent when the belt conveyer speed was 100 m/min or more.

Example 1

A resin, a polyfunctional (meth)acrylate, a pigment, a photopolymerization initiator, and an additive were weighed so as to have the composition shown in Table 1. Specifically, the composition is as follows: 12 parts by mass of a resin 1, 43 parts by mass of a polyfunctional (meth)acrylate 1, 15 parts by mass of a polyfunctional (meth)acrylate 7, 0.1 parts by mass of a polymerization inhibitor, 18 parts by mass of a pigment, 4 parts by mass of a photopolymerization initiator 1, 6 parts by mass of a photopolymerization initiator 2, and 2 parts by mass of an additive. These starting materials were passed through a roller gap 1 of a three roll mill "EXAKT" (Registered Trademark) M-80S (manufactured by EXAKT) five times at a speed of 500 rpm to obtain the lithographic ink.

The obtained lithographic ink was subjected to the viscosity measurement and printing test as described above to evaluate the viscosity, the surface staining resistance, and the glossiness. The results are shown in Table 1.

The thus prepared lithographic ink had a viscosity (A) of 41 Pa·s at a rotational speed of 0.5 rpm, a viscosity (B) of 18 Pa·s at a rotational speed of 20 rpm, a viscosity (C) of 17 Pa·s at a rotational speed of 50 rpm, and a viscosity (D) of 16 Pa·s at a rotational speed of 80 rpm. A viscosity ratio (C)/(B) was 0.94, and a viscosity ratio (D)/(B) was 0.89. tan δ at 1000 rad/s was 1.45, and tan δ at 1 rad/s was 2.56. The surface staining resistance was good with the reflection density in the non-printing area of 0.05. The solid image had a gloss value of 40. The lithographic ink had a favorable misting property. The lithographic ink had good active energy ray curability with a belt conveyor speed of 100 m/min.

[Examples 2 to 9 and Comparative Examples 1 and 2] <Types of Resin>

Lithographic inks were obtained in the same operation as in Example 1 except that the types of the resin were changed to have the compositions shown in Table 1. The lithographic inks produced in Examples 2 to 9 tended to have the viscosities (A), (B), (C), and (D) increasing as the acid value and molecular weight of the resin were larger. The viscosity ratio (C)/(B) was also 0.8 or more, and as a result the surface staining resistance was good. The gloss value of the solid image of the obtained printed material tended to decrease as the viscosity (A) was larger. The curability tended to be good as the iodine number of the resin was higher.

The ink of Comparative Example 1 had all of the viscosities (A), (B), (C) and (D) of less than 5 Pa·s. There was no problem in glossiness, but the reflection density in the non-printing part was 1.38. tan δ at 1 rad/s was 21.8, which caused a largely insufficient misting property.

The ink of Comparative Example 2 had all of the viscosities (A), (B), (C) and (D) of 5 Pa·s or more, but had the viscosity ratio (C)/(B) of 0.8 or less, and the reflection density in the non-printing part was 0.20, which caused insufficient surface staining resistance.

TABLE 1

| | | Examples | | | | | | | | | Comparative Examples | |
|---|---|---|---|---|---|---|---|---|---|---|---|---|
| | | 1 | 2 | 3 | 4 | 5 | 6 | 7 | 8 | 9 | 1 | 2 |
| Composition (Parts by mass) | Resin 1 | 12 | — | — | — | — | — | — | — | — | — | — |
| | Resin 2 | — | 12 | — | — | — | — | — | — | — | — | — |
| | Resin 3 | — | — | 12 | — | — | — | — | — | — | — | — |
| | Resin 4 | — | — | — | 12 | — | — | — | — | — | — | — |
| | Resin 5 | — | — | — | — | 12 | — | — | — | — | — | — |
| | Resin 6 | — | — | — | — | — | 12 | — | — | — | — | — |
| | Resin 7 | — | — | — | — | — | — | 12 | — | — | — | — |
| | Resin 8 | — | — | — | — | — | — | — | 12 | — | — | — |
| | Resin 9 | — | — | — | — | — | — | — | — | 12 | — | — |
| | Resin 10 | — | — | — | — | — | — | — | — | — | 12 | 30 |
| | Polyfunctional (meth) acrylate 1 | 43 | 43 | 43 | 43 | 43 | 43 | 43 | 43 | 43 | 43 | 40 |
| | Polyfunctional (meth) acrylate 7 | 15 | 15 | 15 | 15 | 15 | 15 | 15 | 15 | 15 | 15 | — |
| | Polymerization inhibitor | 0.1 | 0.1 | 0.1 | 0.1 | 0.1 | 0.1 | 0.1 | 0.1 | 0.1 | 0.1 | 0.1 |
| | Pigment | 18 | 18 | 18 | 18 | 18 | 18 | 18 | 18 | 18 | 18 | 18 |
| | Photopolymerization initiator 1 | 4 | 4 | 4 | 4 | 4 | 4 | 4 | 4 | 4 | 4 | 4 |
| | Photopolymerization initiator 2 | 6 | 6 | 6 | 6 | 6 | 6 | 6 | 6 | 6 | 6 | 6 |
| | Additive | 2 | 2 | 2 | 2 | 2 | 2 | 2 | 2 | 2 | 2 | 2 |

| | | | Examples | | | | | | | | | Comparative Examples | |
|---|---|---|---|---|---|---|---|---|---|---|---|---|---|
| | | | 1 | 2 | 3 | 4 | 5 | 6 | 7 | 8 | 9 | 1 | 2 |
| Evaluation | Viscosity (Pa·s) | (A) at 0.5 rpm | 41 | 35 | 64 | 98 | 67 | 48 | 91 | 37 | 72 | 4 | 46 |
| | | (B) at 20 rpm | 18 | 15 | 28 | 43 | 16 | 12 | 35 | 30 | 21 | 3 | 18 |
| | | (C) at 50 rpm | 17 | 13 | 26 | 37 | 13 | 10 | 31 | 26 | 17 | 3 | 13 |
| | | (D) at 80 rpm | 16 | 12 | 23 | 35 | 12 | 8 | 29 | 25 | 12 | 2 | 9 |

TABLE 1-continued

| Viscosity ratio | (C)/(B) | 0.94 | 0.87 | 0.93 | 0.86 | 0.81 | 0.83 | 0.89 | 0.87 | 0.81 | 1.00 | 0.72 |
|---|---|---|---|---|---|---|---|---|---|---|---|---|
| | (D)/(B) | 0.89 | 0.80 | 0.82 | 0.81 | 0.75 | 0.67 | 0.83 | 0.83 | 0.57 | 0.67 | 0.50 |
| tanδ | at 1000 rad/s | 1.45 | 1.87 | 1.40 | 0.98 | 1.83 | 2.02 | 1.16 | 1.77 | 1.81 | 6.31 | 2.16 |
| | at 1 rad/s | 2.56 | 3.18 | 2.24 | 1.61 | 2.64 | 2.81 | 1.79 | 2.58 | 1.94 | 21.80 | 2.9 |
| Surface staining concentration | | 0.05 | 0.1 | 0.03 | 0.02 | 0.08 | 0.11 | 0.02 | 0.03 | 0.14 | 1.38 | 0.2 |
| Gloss | | 40 | 43 | 34 | 25 | 30 | 33 | 27 | 31 | 28 | 46 | 32 |
| Misting | | 0 | 0.04 | 0 | 0 | 0.01 | 0.02 | 0 | 0 | 0 | 0.11 | 0.04 |
| Curability (m/min) | | 100 | 120 | 40 | 35 | 40 | 140 | 50 | 80 | 150 | 60 | 70 |

[Examples 10 to 14 and Comparative Example 3]
<Types of Polyfunctional (Meth)Acrylate>

Lithographic inks were obtained in the same operation as in Example 1 except that the types of the polyfunctional (meth)acrylate were changed to have the compositions shown in Table 2. Among these, the lithographic inks produced in Examples 10 to 12 and 14 had a higher interaction with the resin 1 as the hydroxyl value of the polyfunctional (meth)acrylate was higher, so that all of the viscosity (A), (B), (C), and (D) tended to increase. The viscosity ratio (C)/(B) was also 0.8 or more, and the surface staining resistance was good.

The ink of Comparative Example 3 had all of the viscosities (A), (B), (C) and (D) of 5 Pa·s or more, but had the viscosity ratio (C)/(B) of 0.8 or less, and the reflection density in the non-printing part was 0.18, which caused insufficient surface staining resistance.

TABLE 2

| | | | Examples | | | | | Comparative Examples |
|---|---|---|---|---|---|---|---|---|
| | | | 10 | 11 | 12 | 13 | 14 | 3 |
| Composition (Parts by mass) | Resin 1 | | 12 | 12 | 12 | 12 | 12 | 12 |
| | Polyfunctional (meth) acrylate 1 | | — | — | — | — | — | — |
| | Polyfunctional (meth) acrylate 2 | | 43 | — | — | — | — | — |
| | Polyfunctional (meth) acrylate 3 | | — | 43 | — | — | — | — |
| | Polyfunctional (meth) acrylate 4 | | — | — | 43 | — | — | — |
| | Polyfunctional (meth) acrylate 5 | | — | — | — | 43 | — | — |
| | Polyfunctional (meth) acrylate 6 | | — | — | — | — | 43 | — |
| | Polyfunctional (meth) acrylate 7 | | 15 | 15 | 15 | 15 | 15 | 58 |
| | Polymerization inhibitor | | 0.1 | 0.1 | 0.1 | 0.1 | 0.1 | 0.1 |
| | Pigment | | 18 | 18 | 18 | 18 | 18 | 18 |
| | Photopolymerization initiator 1 | | 4 | 4 | 4 | 4 | 4 | 4 |
| | Photopolymerization initiator 2 | | 6 | 6 | 6 | 6 | 6 | 6 |
| | Additive | | 2 | 2 | 2 | 2 | 2 | 2 |

| | | | Examples | | | | | Comparative Examples |
|---|---|---|---|---|---|---|---|---|
| | | | 10 | 11 | 12 | 13 | 14 | 3 |
| Evaluation | Viscosity (Pa·s) | (A) at 0.5 rpm | 49 | 32 | 71 | 61 | 36 | 31 |
| | | (B) at 20 rpm | 24 | 11 | 32 | 20 | 15 | 21 |
| | | (C) at 50 rpm | 22 | 9 | 28 | 16 | 14 | 16 |
| | | (D) at 80 rpm | 20 | 7 | 26 | 11 | 12 | 12 |
| | Viscosity ratio | (C)/(B) | 0.92 | 0.82 | 0.88 | 0.80 | 0.93 | 0.76 |
| | | (D)/(B) | 0.83 | 0.64 | 0.81 | 0.55 | 0.80 | 0.57 |
| | tanδ | at 1000 rad/s | 1.36 | 1.90 | 1.14 | 0.94 | 1.58 | 1.93 |
| | | at 1 rad/s | 2.35 | 3.21 | 1.89 | 1.86 | 2.71 | 2.88 |
| | Surface staining concentration | | 0.04 | 0.13 | 0.03 | 0.08 | 0.06 | 0.18 |
| | Gloss | | 35 | 38 | 28 | 29 | 39 | 31 |
| | Misting | | 0.01 | 0.04 | 0 | 0 | 0.02 | 0.04 |
| | Curability (m/min) | | 95 | 100 | 60 | 130 | 100 | 105 |

[Examples 15 to 19] <Content of Polyfunctional (Meth)Acrylate Having Hydroxyl Group>

Lithographic inks were obtained in the same operation as in Example 1 except that the content of the polyfunctional (meth)acrylate was changed as shown in Table 3. The lithographic inks produced in Examples 15 to 17 contained a polyfunctional (meth)acrylate having hydroxyl group in a higher content than that in Example 1, and all of the viscosities (A), (B), and (C) tended to increase. The lithographic inks produced in Examples 18 and 19 contained a polyfunctional (meth)acrylate having hydroxyl group in a lower content than that in Example 1, and all of the viscosities (A), (B), and (C) tended to decrease. The lithographic inks produced in Examples 15 to 19 had the viscosity ratio (C)/(B) of 0.8 or more, and as a result the surface staining resistance was good. The gloss value of the solid image of the printed material tended to increase as the viscosity decreased.

TABLE 3

|  |  |  | Examples | | | | |
|---|---|---|---|---|---|---|---|
|  |  |  | 15 | 16 | 17 | 18 | 19 |
| Composition (Parts by mass) | | Resin 1 | 12 | 12 | 12 | 12 | 12 |
| | | Polyfunctional (meth) acrylate 1 | 72 | 62 | 52 | 99 | 17 |
| | | Polyfunctional (meth) acrylate 7 | — | — | 6 | 29 | 41 |
| | | Polymerization inhibitor | 0.1 | 0.1 | 0.1 | 0.1 | 0.1 |
| | | Pigment | 12 | 18 | 18 | 18 | 18 |
| | | Photopolymerization initiator 1 | 2 | 4 | 4 | 4 | 4 |
| | | Photopolymerization initiator 2 | 2 | 2 | 6 | 6 | 6 |
| | | Additive | — | 2 | 2 | 2 | 2 |
| Evaluation | Viscosity (Pa · s) | (A) at 0.5 rpm | 61 | 54 | 47 | 34 | 19 |
| | | (B) at 20 rpm | 24 | 23 | 20 | 14 | 10 |
| | | (C) at 50 rpm | 20 | 21 | 18 | 12 | 8 |
| | | (D) at 80 rpm | 15 | 19 | 15 | 9 | 6 |
| | Viscosity ratio | (C)/(B) | 0.83 | 0.91 | 0.90 | 0.86 | 0.80 |
| | | (D)/(B) | 0.63 | 0.83 | 0.75 | 0.64 | 0.60 |
| | tanδ | at 1000 rad/s | 1.19 | 1.37 | 1.40 | 1.55 | 1.79 |
| | | at 1 rad/s | 1.96 | 2.31 | 2.43 | 2.77 | 3.02 |
| | Surface staining concentration | | 0.09 | 0.02 | 0.03 | 0.08 | 0.15 |
| | Gloss | | 29 | 34 | 37 | 32 | 29 |
| | Misting | | 0 | 0 | 0.01 | 0.03 | 0.05 |
| | Curability (m/min) | | 100 | 95 | 100 | 105 | 110 |

[Examples 20 to 23] <Types of Surfactant>

Lithographic inks were obtained in the same operation as in Example 1 except that the types of the surfactant were changed and the content of the polyfunctional (meth)acrylate was changed as shown in Table 1. The lithographic inks produced in Examples 20 to 23 were evaluated for the surface staining concentration and gloss value of a printed material in the water printing test. The lithographic inks produced in Examples 20 to 23 had all of the viscosities (A), (B), (C) and (D) of 10 Pas or more, and had the viscosity ratio (C)/(B) of 0.8 or more, and as a result the surface staining resistance was good. However, the ink of Example 22 in which the HLB value of the surfactant was less than 8 had a similar rheology to that of each of the inks of Examples 20 and 21, but the ink of Example 22 tended to have poor surface staining resistance as compared with the inks of Examples 20 and 21. The solid image of each of the obtained printed materials had an excellent gloss value of 35 or more.

TABLE 4

|  |  | Examples | | | |
|---|---|---|---|---|---|
|  |  | 20 | 21 | 22 | 23 |
| Composition (Parts by mass) | Resin 1 | 12 | 12 | 12 | 12 |
| | Polyfunctional (meth) acrylate 1 | 43 | 43 | 43 | 43 |

TABLE 4-continued

|  |  |  | Examples | | | |
| --- | --- | --- | --- | --- | --- | --- |
|  |  |  | 20 | 21 | 22 | 23 |
|  | Polyfunctional (meth) acrylate 7 | | 17 | 17 | 17 | 17 |
|  | Polymerization inhibitor | | 0.1 | 0.1 | 0.1 | 0.1 |
|  | Pigment | | 18 | 18 | 18 | 18 |
|  | Photopolymerization initiator 1 | | 4 | 4 | 4 | 4 |
|  | Photopolymerization initiator 2 | | 6 | 6 | 6 | 6 |
|  | Additive | | — | — | — | — |
|  | Surfactant 1 | | 0.2 | — | — | — |
|  | Surfactant 2 | | — | 0.2 | — | — |
|  | Surfactant 3 | | — | — | 0.2 | — |
| Evaluation | Viscosity (Pa·s) | (A) at 0.5 rpm | 41 | 42 | 40 | 42 |
|  |  | (B) at 20 rpm | 17 | 18 | 16 | 18 |
|  |  | (C) at 50 rpm | 15 | 16 | 14 | 16 |
|  |  | (D) at 80 rpm | 14 | 15 | 12 | 14 |
|  | Viscosity ratio | (C)/(B) | 0.88 | 0.89 | 0.88 | 0.89 |
|  |  | (D)/(B) | 0.82 | 0.83 | 0.75 | 0.78 |
|  | tanδ | at 1000 rad/s | 1.41 | 1.43 | 1.74 | 1.40 |
|  |  | at 1 rad/s | 2.59 | 2.53 | 2.83 | 2.45 |
|  | Surface staining concentration | | 0.03 | 0.03 | 0.07 | 0.07 |
|  | Gloss | | 41 | 40 | 39 | 38 |
|  | Misting | | 0 | 0 | 0.02 | 0 |
|  | Curability (m/min) | | 100 | 100 | 100 | 100 |

The invention claimed is:

1. A lithographic ink which comprises:
a resin having a hydrophilic group and having a weight average molecular weight of from 5,000 to 100,000, and
a polyfunctional (meth)acrylate having a hydroxyl group and a hydroxyl value of 136 mgKOH/g or more and 200 mgKOH/g or less,
wherein
the resin having a hydrophilic group has
an acid value of 60 mgKOH/g or more and 250 mgKOH/g or less, and
a weight average molecular weight of 20,000 to 100,000,
the content of the polyfunctional (meth)acrylate having a hydroxyl group in the lithographic ink is 30% by mass or more and 70% by mass or less,
the lithographic ink has all of the following viscosities:
a viscosity (A) at a rotational speed of 0.5 rpm,
a viscosity (B) at a rotational speed of 20 rpm, and
a viscosity (C) at a rotational speed of 50 rpm
of 5 Pa·s or more and 100 Pa·s or less,
the viscosities (A), (B), and (C) being measured by using a cone-plate rotating viscometer at 25° C., and having a viscosity ratio (C)/(B) of 0.85 or more and 1.0 or less.

2. The lithographic ink according to claim 1, wherein the viscosity (B) and the viscosity (C) are 5 Pa·s or more and 40 Pa·s or less.

3. The lithographic ink according to claim 1, wherein the viscosity (A) is 20 Pa·s or more and 80 Pa·s or less.

4. The lithographic ink according to claim 1, which has a viscosity (D) at a rotational speed of 80 rpm of 5 Pa·s or more and 100 Pa·s or less, the viscosity (D) being measured by using a cone-plate rotating viscometer at 25° C., and has a viscosity ratio (D)/(B) of 0.8 or more and 1 or less.

5. The lithographic ink according to claim 1, wherein a loss tangent (tan δ) value at 25° C. and 1000 (rad/s) is 1.0 or more and 2.0 or less.

6. The lithographic ink according to claim 1, wherein a loss tangent (tan δ) value at 25° C. and 1 (rad/s) is 2.0 or more and 3.0 or less.

7. The lithographic ink according to claim 1, wherein the hydrophilic group is an acidic group.

8. The lithographic ink according to claim 1, wherein the resin having a hydrophilic group further has an ethylenically unsaturated group.

9. The lithographic ink according to claim 8, wherein the ethylenically unsaturated group in the resin having a hydrophilic group has an iodine number of 0.5 mol/kg or more and 3.0 mol/kg or less.

10. The lithographic ink according to claim 1, wherein a content of the polyfunctional (meth)acrylate having a hydroxyl group is 20% by mass or more and 70% by mass or less in relation to a total amount of the lithographic ink.

11. The lithographic ink according to claim 1, further comprising a photopolymerization initiator.

12. The lithographic ink according to claim 1, further comprising at least one component selected from silicone fluid, alkyl(meth)acrylate, vegetable oil, fatty acid ester from vegetable oil, hydrocarbon solvent, and fluorocarbon.

13. The lithographic ink according to claim 1, further comprising a surfactant.

14. The lithographic ink according to claim 13, wherein the surfactant has an HLB value of 8 or more and 18 or less.

15. The lithographic ink according to claim 1, wherein the resin having a hydrophilic group is dissolved in the polyfunctional (meth)acrylate having a hydroxyl group so as to form a solution.

16. A method for manufacturing a printed material, the method comprising the step of applying the lithographic ink according to claim 1 onto a substrate.

17. A method for manufacturing a printed material, the method comprising the step of applying the lithographic ink according to claim 1 onto a substrate and thereafter curing the lithographic ink by irradiation with an active energy ray.

* * * * *